(12) United States Patent
Choi et al.

(10) Patent No.: US 9,577,240 B2
(45) Date of Patent: Feb. 21, 2017

(54) BATTERY MODULE AND BUS BAR APPLIED TO BATTERY MODULE

(71) Applicant: LG CHEM, LTD., Seoul (KR)

(72) Inventors: Jun-Seok Choi, Daejeon (KR); Jin-Kyu Lee, Daejeon (KR); Tae-Hwan Roh, Daejeon (KR); Seung-Don Choi, Daejeon (KR); Seong-Tae Kim, Daejeon (KR); Tae-Hyuck Kim, Daejeon (KR); Jung-Hoon Yang, Daejeon (KR); Min-Chul Jang, Daejeon (KR); In-Cheol Shin, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 359 days.

(21) Appl. No.: 13/959,381

(22) Filed: Aug. 5, 2013

(65) Prior Publication Data

US 2013/0323549 A1    Dec. 5, 2013

Related U.S. Application Data

(63) Continuation of application No. PCT/KR2012/010182, filed on Nov. 28, 2012.

(30) Foreign Application Priority Data

Nov. 28, 2011  (KR) .......................... 10-2011-0125225
Nov. 28, 2012  (KR) .......................... 10-2012-0135793

(51) Int. Cl.
  *H01M 2/34*    (2006.01)
  *H01M 2/30*    (2006.01)
  (Continued)

(52) U.S. Cl.
  CPC .............. *H01M 2/34* (2013.01); *H01M 2/1016* (2013.01); *H01M 2/202* (2013.01); *H01M 2/204* (2013.01);
  (Continued)

(58) Field of Classification Search
  CPC ..................................................... H01M 10/63
  See application file for complete search history.

(56) References Cited

U.S. PATENT DOCUMENTS 6,040,754 A    3/2000  Kawanishi
7,609,028 B2   10/2009 Ha et al.
(Continued)

FOREIGN PATENT DOCUMENTS

CN    101253662 A    8/2008
EP    0 964 419 A1   12/1999
(Continued)

OTHER PUBLICATIONS

International Search Report for PCT/KR2012/010182 mailed Mar. 29, 2013.

*Primary Examiner* — Jacob Marks
(74) *Attorney, Agent, or Firm* — Birch, Stewart, Kolasch & Birch, LLP (57) ABSTRACT

Disclosed is a battery module capable of ensuring safety in use by breaking a bus bar when an overcurrent flows at the battery module. The battery module includes at least one unit cell, a case for accommodating the unit cell, and a bus bar electrically connected to the unit cell, wherein the bus bar includes a first metal plate, a second metal plate spaced apart from the first metal plate, and a metal bridge configured to connect the first metal plate and the second metal plate and having a lower melting point than the metal plate.

19 Claims, 11 Drawing Sheets

(51) Int. Cl.
*H01M 2/20* (2006.01)
*H01M 2/10* (2006.01)
*H01M 10/647* (2014.01)
*H01M 10/6557* (2014.01)

(52) U.S. Cl.
CPC .............. *H01M 2/30* (2013.01); *H01M 2/348* (2013.01); *H01M 2/1061* (2013.01); *H01M 10/647* (2015.04); *H01M 10/6557* (2015.04); *H01M 2200/103* (2013.01)

(56) References Cited

U.S. PATENT DOCUMENTS

| | | | | |
|---|---|---|---|---|
| 2004/0066268 | A1* | 4/2004 | Iwamoto | C22C 12/00 337/159 |
| 2005/0266279 | A1* | 12/2005 | Kim | H01M 2/12 429/7 |
| 2006/0127754 | A1* | 6/2006 | Hamada | H01M 2/206 429/158 |
| 2007/0019351 | A1 | 1/2007 | Whitney et al. | |
| 2008/0192399 | A1 | 8/2008 | Chen | |
| 2008/0305367 | A1* | 12/2008 | Baek | H01M 2/0215 429/7 |
| 2009/0159311 | A1 | 6/2009 | Zheng et al. | |
| 2009/0297892 | A1 | 12/2009 | Ijaz et al. | |
| 2010/0176910 | A1 | 7/2010 | Knab et al. | |
| 2010/0247987 | A1* | 9/2010 | Holung | H01M 10/052 429/62 |
| 2010/0323235 | A1 | 12/2010 | Takami et al. | |
| 2011/0244280 | A1 | 10/2011 | Byun et al. | |
| 2012/0126929 | A1 | 5/2012 | Tong et al. | |

FOREIGN PATENT DOCUMENTS

| | | |
|---|---|---|
| JP | 2001-256937 A | 9/2001 |
| JP | 2007-35280 A | 2/2007 |
| JP | 2009-211936 A | 9/2009 |
| JP | 2011-510433 A | 3/2011 |
| KR | 2003-0025077 A | 3/2003 |
| KR | 10-2006-0073455 A | 6/2006 |
| KR | 10-2008-0042961 A | 5/2008 |
| KR | 10-2008-0100980 A | 11/2008 |
| KR | 10-2011-0109769 A | 10/2011 |
| WO | WO 2010/133176 A1 | 11/2010 |

* cited by examiner

BATTERY MODULE AND BUS BAR APPLIED TO BATTERY MODULE

CROSS-REFERENCE TO RELATED APPLICATION

The present application is a continuation of International Application No. PCT/KR2012/010182 filed on Nov. 28, 2012, which claims priority to Korean Patent Application No. 10-2011-0125225 filed on Nov. 28, 2011, and Korean Patent Application No. 10-2012-0135793 filed on Nov. 28, 2012, in the Republic of Korea, the disclosures of which are incorporated herein by reference.

TECHNICAL FIELD

The present disclosure relates to a battery module with improved safety at a short circuit and a bus bar applied thereto, and more particularly, to a battery module having an improved structure to prevent explosion or firing caused by the increase of temperature in a battery due to a short circuit and a bus bar applied thereto.

BACKGROUND ART

As portable electric products such as video cameras, portable phones and portable PC are more actively used, the importance of a secondary battery generally used as a driving source of such a portable electric product is increasing.

Different from a primary battery which may not be charged, a secondary battery allows charging and discharging and is actively studied in high-tech industries such as digital cameras, cellular phones, laptop computers, power tools, electric bicycles, electric vehicles, hybrid vehicles, mass-capacity power storage device or the like.

In particular, the use of a lithium secondary battery is gaining since it has a high energy density per unit weight and allows rapid charging in comparison to other existing secondary batteries such as lead storage batteries, nickel-cadmium batteries, nickel-hydrogen batteries, nickel-zinc batteries or the like.

The lithium secondary battery has an operating voltage of 3.6V or above and is used as a power source of a portable electronic device. In other cases, a plurality of batteries are connected in series or in parallel and used for high-power electric vehicles, hybrid vehicles, power tools, electric bicycles, power storage devices, UPS or the like.

The lithium secondary battery has a triple operating voltage in comparison to nickel-cadmium batteries or nickel-metal hydride batteries and is used more and more due to its high energy density per unit weight.

Depending on the kind of electrolyte, a lithium secondary battery may be classified into a lithium ion battery using a liquid electrolyte and a lithium ion polymer battery using a solid electrolyte. In addition, depending on the kind of polymer solid electrolyte, the lithium ion polymer battery may be classified into an all solid lithium ion polymer battery containing no electrolyte and a lithium ion polymer battery using a gel-type polymer electrolyte containing an electrolyte.

Lithium ion batteries using a liquid electrolyte mostly use a cylindrical or rectangular metal can as a container and are sealed therein by welding. A can type secondary battery using such a metal can as a container has a fixed shape and thus limits the design of an electric product which uses the battery as a power source. In addition, it is difficult to decrease the volume of the product. Therefore, a pouch type secondary battery prepared by putting an electrode assembly and an electrolyte into a pouch package made of a film and then sealing the same has been developed and used.

However, the lithium secondary battery may explode when being overheated, and so issues of ensuring safety is of major concern. The lithium secondary battery may be overheated due to various factors, of which an example is a case in which an overcurrent exceeding a limit flows through the lithium secondary battery. If an overcurrent flows, the lithium secondary battery generates Joule's heat and thus an internal temperature of the battery rapidly increases. In addition, the rapid increase of temperature causes a decomposition reaction of the electrolyte and thermal runaway, which may lead to explosion of the battery. An overcurrent may occur when a sharp metallic matter pierces the lithium secondary battery, when an insulation between a cathode and an anode breaks due to the shrinkage of a separator interposed between the cathode and the anode, when a rush current is applied to the battery due to an abnormal charging circuit or a load connected to the outside, or the like.

Therefore, the lithium secondary battery is coupled to a protection circuit in order to protect the battery against abnormal states such as the occurrence of an overcurrent. The protection circuit generally includes a fuse element which irreversibly disconnects a line where a charging or discharging current flows when an overcurrent occurs.

Figure 1:
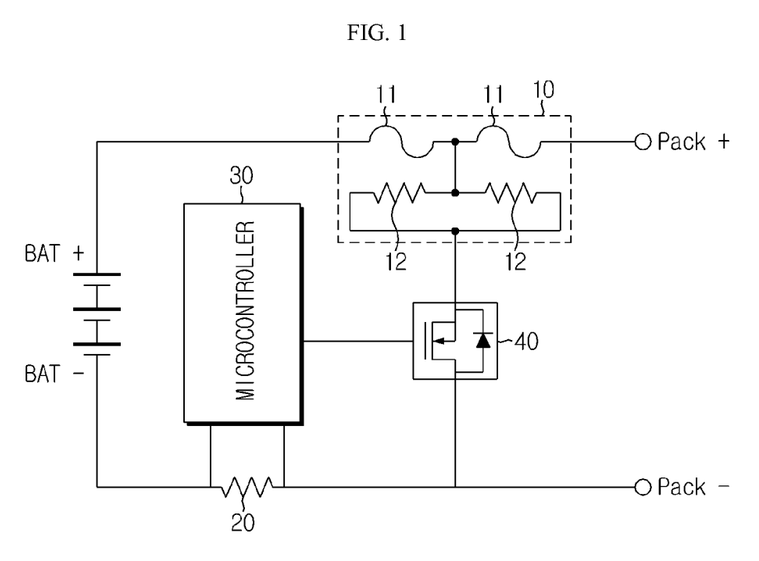
FIG. 1 is a circuit diagram for illustrating an arrangement and an operating mechanism of a fuse element employed in a protection circuit coupled to a battery module.

FIG. 1 is a circuit diagram for illustrating an arrangement and an operating mechanism of a fuse element employed in a protection circuit coupled to a battery module which includes a lithium secondary battery.

As shown in FIG. 1, a protection circuit includes a fuse element 1, a sense resistor 20 for sensing an overcurrent, a microcontroller 30 for monitoring an occurrence of an overcurrent and operating the fuse element 10 when an overcurrent occurs, and a switch 40 for switching the flow of an operating current to the fuse element 10 in order to protect a battery module when an overcurrent occurs.

The fuse element 10 is installed to a main line connected to the outermost terminal of the battery module. The main line represents a wire through which a charging current or a discharging current flows. In FIG. 1, it is depicted that the fuse element 10 is installed at a high potential line (Pack+).

The fuse element 10 is a three-terminal element, in which two terminals are connected to the main line through which a charging or discharging current flows and one terminal is connected to the switch 40. In addition, the fuse element includes a fuse 11 connected to the main line in series and disconnected at a specific temperature and a resistor 12 for applying heat to the fuse 11.

The microcontroller 30 monitors the occurrence of an overcurrent by periodically detecting voltages at both ends of the sense resistor 20, and turns on the switch 40 if it is determined that an overcurrent occurs. In this case, the current flowing through the main line flows to the fuse element 10 by bypassing and is applied to the resistor 12. Accordingly, the Joule's heat generated at the resistor 12 is conducted to the fuse 1a to raise the temperature of the fuse 11. If the temperature of the fuse 11 increases to a melting temperature, the fuse 11 is fused to irreversibly cut the main line. If the main line is cut, the overcurrent does not flow any more, which solves problems caused from the overcurrent.

However, the above techniques have several problems. For example, if the microcontroller 30 malfunctions, even though an overcurrent occurs, the switch 40 does not turn on. In this case, a current is not applied to the resistor 12 of the fuse element 10, and therefore the fuse element 10 does not operate. In addition, a space for disposing the fuse element 10 should be separately provided in the protection circuit, and a program algorithm for controlling operations of the fuse element 10 should be loaded on the microcontroller 30. Therefore, the spatial efficiency of the protection circuit deteriorates, and the load of the microcontroller 30 increases.

DISCLOSURE

Technical Problem

The present disclosure is designed to solve the problems of the prior art, and therefore it is an object of the present disclosure to provide a battery module which may ensure safety in use by easily breaking a bus bar when a temperature increases due to the occurrence of an abnormality while the battery module is in use by configuring the bus bar for connecting a cell to an external terminal to have a double structure, and a bus bar applied thereto.

Technical Solution

In one aspect of the present disclosure, there is provided a battery module, which includes at least one unit cell; a case for accommodating the unit cell; and a bus bar electrically connected to the unit cell, wherein the bus bar includes a first metal plate; a second metal plate spaced apart from the first metal plate; and a metal bridge configured to connect the first metal plate and the second metal plate and having a lower melting point than the metal plate.

Preferably, the metal bridge may be a lead-free alloy containing tin (Sn) and copper (Cu) as main components.

The content of the tin is preferably 80 to 98 wt %, and the content of the copper is preferably 2 to 20 wt %.

Selectively, the metal bridge may further include at least one additional metal selected from the group consisting of nickel (Ni), zinc (Zn) and silver (Ag). In this case, the content of the additional metal is preferably 0.01 to 10 wt %.

The metal bridge is preferably formed to have a melting point of 150 to 300° C.

Preferably, the first metal plate and the second metal plate may be located on the same plane with a regular gap.

According to an aspect of the present disclosure, the metal bridge may be joined to the first metal plate and the second metal plate on any one surface or both surfaces of the first metal plate and the second metal plate.

According to another aspect of the present disclosure, the first metal plate and the second metal plate may have accommodation grooves formed in at least one of the upper and lower surfaces at one side end thereof, which face each other, and the metal bridge may be sized and shaped corresponding to the accommodation groove, and may be accommodated in a space formed by engagement of the accommodation grooves and joined to the first metal plate and the second metal plate.

According to another aspect of the present disclosure, the first metal plate and the second metal plate may have a first bent portion and a second bent portion respectively formed at one side end of the first metal plate and one side end of the second metal plate which face each other, and the metal bridge may be accommodated in a space formed by engagement of the first bent portion and the second bent portion and joined to the first metal plate and the second metal plate.

According to another aspect of the present disclosure, the first metal plate and the second metal plate may have accommodation grooves formed with a predetermined depth from surfaces thereof which face each other, and both sides of the metal bridge may be respectively inserted into the accommodation grooves and joined to the metal plate.

According to another aspect of the present disclosure, the metal bridge may be directly interposed between surfaces of the first metal plate and the second metal plate which face each other and joined to the first metal plate and the second metal plate.

The facing surfaces may have an inclined surface tapered toward the metal soldering bridge.

According to another aspect of the present disclosure, the first metal plate and the second metal plate may be located so that one side of the first metal plate and one side of the second metal plate face each other while overlapping each other at least partially, and the metal bridge may be interposed in the facing region and joined to the first metal plate and the second metal plate.

According to another aspect of the present disclosure, the first metal plate and the second metal plate may be located so that one side of the first metal plate and one side of the second metal plate face each other while overlapping each other at least partially, and the metal bridge may be formed at one side and the other side of a circumference of the facing region.

Preferably, the first metal plate and the second metal plate may be located so that one side of the first metal plate and one side of the second metal plate face each other while overlapping each other at least partially, and the metal bridge may be formed at the entire circumference of the facing region.

Preferably, the battery module may further include a rivet for fixing the first metal plate and the metal bridge and fixing the second metal plate and the metal bridge.

Preferably, one side of the first metal plate and one side of the second metal plate which face each other have a tapered shape which is narrowed toward an end thereof.

Meanwhile, the battery module may further include an external terminal installed at one side of the case, and the bus bar may be installed to connect the unit cell and the external terminal.

In another aspect of the present disclosure, there is also provided a battery module which includes at least one unit cell including a cathode lead and an anode lead; a case for accommodating the unit cell; a first bus bar connected to the cathode lead; and a second bus bar connected to the anode lead, wherein the second bus bar includes a first metal plate; a second metal plate spaced apart from the first metal plate; and a metal bridge configured to connect the first metal plate and the second metal plate and having a lower melting point than the metal plate.

Meanwhile, in another aspect of the present disclosure, there is also provided a bus bar which is applied to a battery module and includes a first metal plate; a second metal plate spaced apart from the first metal plate; and a metal bridge configured to connect the first metal plate and the second metal plate and having a lower melting point than the metal plate.

Advantageous Effects

According to the present disclosure, when a protection circuit does not operate normally to cause an overcurrent to flow through a battery module, a bus bar is rapidly broken to ensure safety when the battery module is in use.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which:

FIG. 4b is a front view of the battery module depicted in FIG. 4a;

FIGS. 5 to 9c are partial perspective views showing the portion A of FIG. 4b, which depict various modifications of the bus bar according to an embodiment of the present disclosure;

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an overall configuration of a battery module according to the present disclosure will be described with reference to FIGS. 2 to 4b.

Referring to FIGS. 2 to 4b, a battery module 1 according to the present disclosure includes a battery cell 100, a bus bar 200, a case 300, an external terminal 311 and a voltage sensor 321.

The battery cell 100 is formed by stacking unit modules 100A, 100B, 100C, 100D which are composed of at least one unit cells 110A, 110B and a cell cover 120 surrounding the unit cells 110A, 110B.

Figure 2:
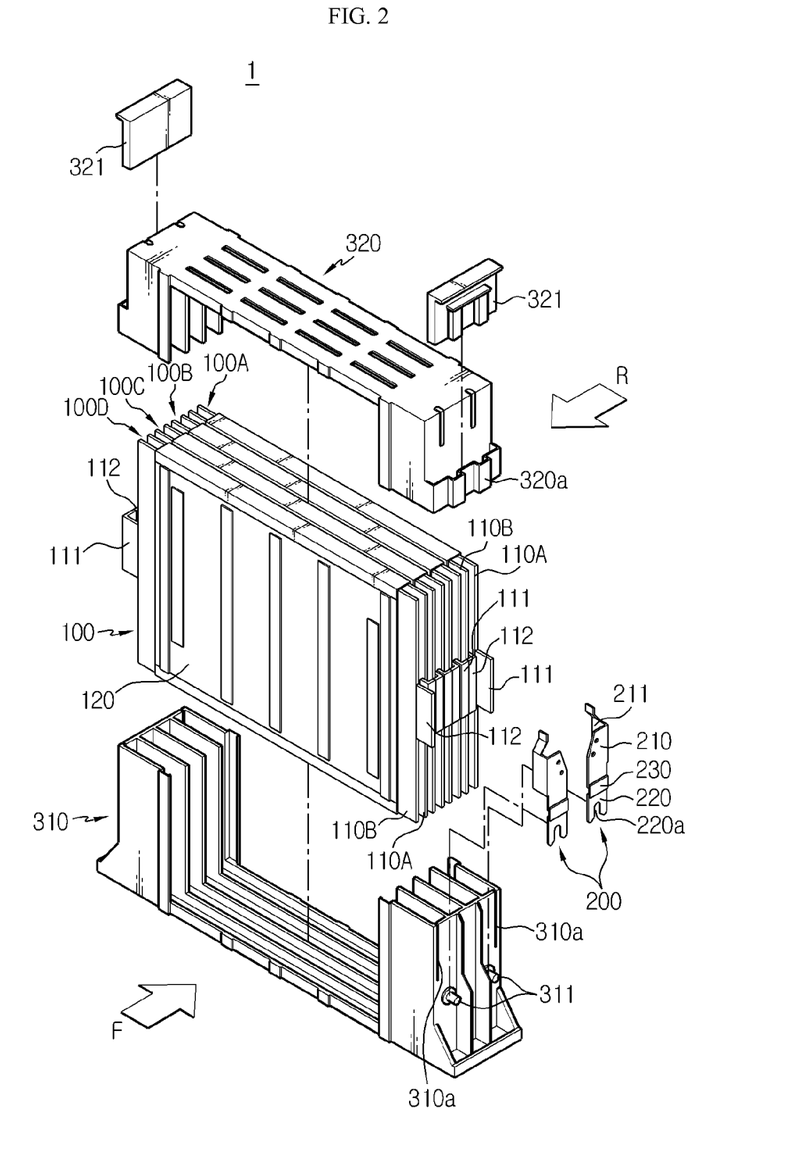
FIG. 2 is an exploded perspective view showing a battery module according to an embodiment of the present disclosure.
Figure 3:
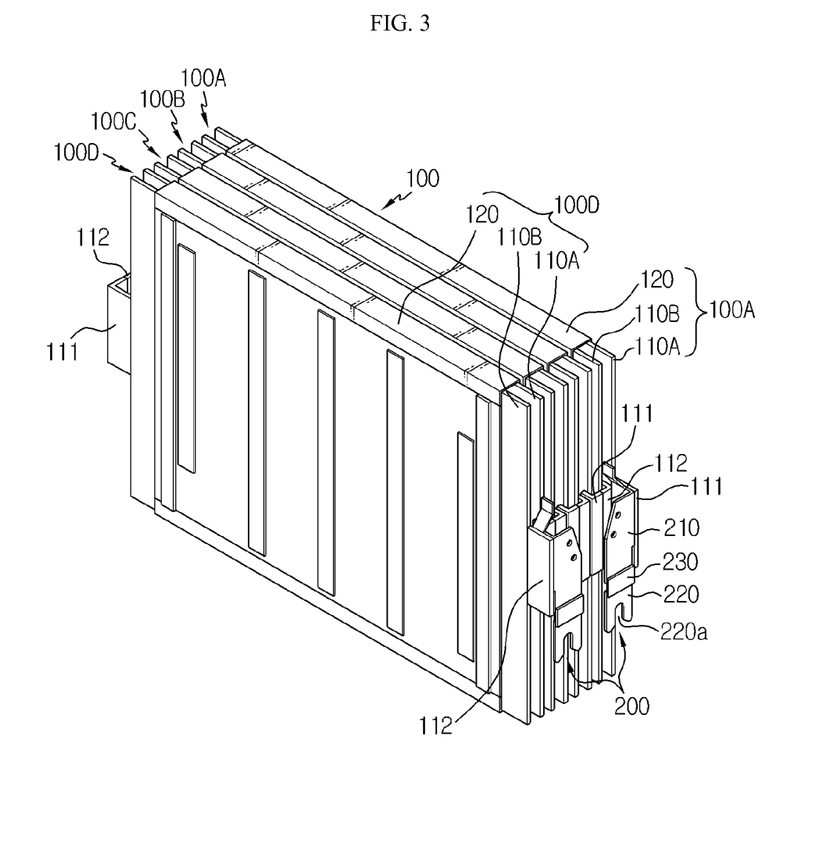
FIG. 3 is a perspective view showing a battery cell of the battery module according to an embodiment of the present disclosure, which is coupled to a bus bar.
Figure 4A:
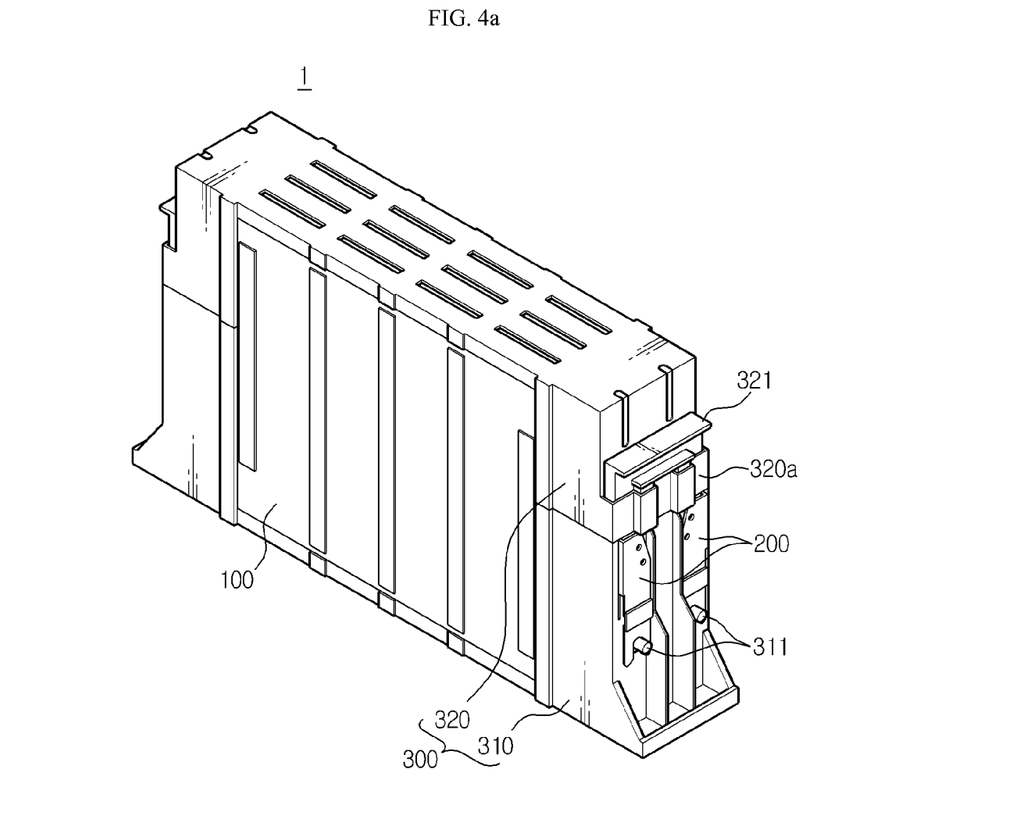
FIG. 4a is a perspective view showing an assembled state of a battery module according to an embodiment of the present disclosure.
Figure 4B:
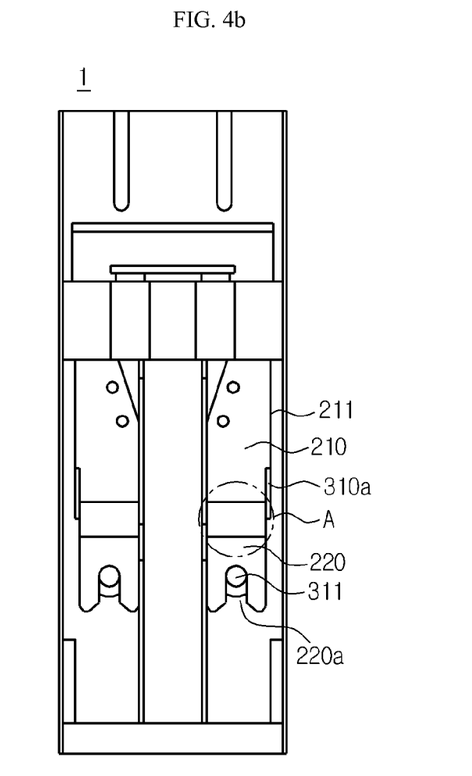

The unit cells 110A, 110B includes an electrode assembly (not shown) accommodated in an exterior member and a first electrode lead 111 and a second electrode lead 112 respectively connected to uncoated parts of first and second electrode plates of the electrode assembly and respectively drawn toward one side and the other side of the exterior member. In the present disclosure, the first and second electrode plates are respectively a cathode plate and an anode plate, for example. Accordingly, the first and second electrode leads 111, 112 will be described as cathode and anode leads 111, 112.

In general, the cathode plate is made of aluminum (Al), and the anode plate is made of copper (Cu). Therefore, in aspect of weldability and minimization of electric resistance between the electrode plate and the electrode leads 111, 112, the cathode lead 111 is preferably made of aluminum (Al), identical to the cathode plate, and the anode lead 112 is preferably made of copper (Cu) or nickel (Ni)-coated copper (Cu), identical to the anode plate.

In the case there are a plurality of unit cells 110A, 110B and a plurality of unit modules 100A-100D, the unit cells 110A, 110B and the unit modules 100A-100D may be connected to each other in series or in parallel depending on the use of the battery. However, the present disclosure will be described based on the case of the serial connection. In other words, in the present disclosure, the unit cells 110A, 110E are connected to each other in a way that a cathode lead 111 of a single unit cell 110A is coupled to an anode lead 112 of a unit cell 110B adjacent thereto. In this case, a cathode lead 111 of a unit cell 110A located at the outermost side of the rear surface (in R direction) and an anode lead 112 of a unit cell 110B located at the outermost side of the front surface (in F direction) are respectively coupled to a bus bar 200, described later.

Meanwhile, with regard to the number of the unit cells 110A, 110B and the unit modules 100A-100D, the present disclosure illustrates two unit cells 110A, 110B and four unit modules 100A-100D which are stacked. However, this is just an example, and it should be understood that the number of unit cells 110A, 110B and unit modules 100A-100D is not limited thereto.

The bus bar 200 is coupled to the cathode lead 111 of the unit cell 110A located at the outermost side of the rear surface R of the battery cell 100 and the anode lead 112 of the unit cell 110B located at the outermost side of the front surface F and includes metal bridges for the connection among a first metal plate 210, a second metal plate 220 and metal plate 210, 220.

The metal plates 210, 220 of the bus bars 200 respectively attached to the cathode lead 111 and the anode lead 112 may be made of different materials. In other words, the metal plates 210, 220 of the bus bar 200 attached to the cathode lead 111 is preferably made of aluminum, identical to the cathode lead 111, and the metal plates 210, 220 of the bus bar 200 attached to the anode lead 112 is preferably made of copper or nickel-coated copper, identical to the anode lead 112. However, the bus bars are substantially identical to each other except for their materials. Therefore, the bus bar 200 attached to the cathode lead 111 will be described in the present disclosure.

The first metal plate 210 and second metal plate 220 are made of a metal with a thin plate shape. The first metal plate 210 has a lead coupling portion 210 formed by bending one side thereof into an approximately 'L' shape. The lead coupling portion 211 is respectively coupled to one side end of the cathode lead 111 and one side end of the cathode lead 112 by welding. The second metal plate 220 is located spaced apart from the first metal plate 220 by a predetermined distance and has a terminal groove 220a at an end opposite to the location of the first metal plate 210 so that the external terminal 311 may be inserted therein.

The metal bridge 230 connects the metal plates 210, 220. Various embodiments in relation to detailed connection structures will be described later with reference to FIGS. 5 to 11, and only roles and properties of the metal bridge 230 will be described here.

The metal bridge 230 is fused when the battery module 1 is overheated, and thus plays a role of releasing an electric connection between the first metal plate 210 and the second metal plate 220. Preferably, the metal bridge 230 is made of a lead-free alloy containing tin (Sn) and copper (Cu) as main components and not containing lead (Pb) which is harmful to environments and human bodies, and has a melting point of about 150 to 300° C. The melting point range is lower than a melting point of a single metal selected from aluminum, copper and nickel-coated copper, which are used for the leads 111, 112 and/or the metal plates 210, 220. Therefore, it is possible to rapidly interrupt the overcurrent.

The melting point range of the metal bridge 230 is determined in consideration of a maximum voltage and a maximum current which the bus bar 200 should endure, an overcurrent level to be interrupted by the bus bar 200, an electric property (resistance) and/or a mechanical property (tensile strength) demanded to the bus bar 200. If the melting point of the metal bridge 230 is lower than 150° C., the bus bar 200 may be broken by a current which flows when the battery module 1 operates normally. In addition, if the melting point of the metal bridge 230 is higher than 300° C., the overcurrent may not be effectively interrupted.

The contents of tin and copper contained in the metal bridge 230 may be suitably adjusted according to the melting point of the metal bridge 230 or the electric property and/or physical property to be endowed to the metal bridge 230 or the bus bar 200.

Among the components of the metal bridge 230, tin gives an influence on the melting point and tensile strength of the metal bridge 230. For the metal bridge 230 to have a melting point of 150 to 300° C. as well a good tensile strength, the content of tin is adjusted to 80 wt % or above, preferably in the range of 85 to 98 wt %. Here, wt % is a unit based on the entire weight of the materials of the metal bridge 230.

Among the components of the metal bridge 230, copper gives an influence on electric conductivity, melting point and tensile strength of the bus bar 200, and in consideration of such functions of copper, the content of copper is adjusted in the range of 2 to 20 wt %, preferably in the range of 4 to 15 wt %.

By adjusting the contents of tin and copper as described above, a good tensile strength of the metal bridge 230 may be obtained, and the increase of resistance caused by the metal bridge 230 may be controlled to be lower than several %. Moreover, the melting point of the metal bridge 230 may be adjusted in the range of 150 to 300° C.

Selectively, the metal bridge 230 may further include any one metal selected from nickel (Ni), zinc (Zn) and silver (Ag) in order to improve the electric property and/or mechanical property. The content of the additional metal may be adjusted according to the electric property and/or mechanical property to be endowed to the metal bridge 230, preferably in the range of 0.01 to 10 wt %.

Meanwhile, even though the present disclosure illustrates that the metal bridges 230 are applied to both the cathode lead 111 and the anode lead 112, the present disclosure may be also applied to a case in which the metal bridge 230 is applied only to any one lead. In the case in which the bus bar 200 is applied to only one lead, the present disclosure is preferably applied to the anode lead 112 having a greater caloric value, and a general bus bar is applied to the cathode lead 111.

The case 300 accommodates the battery cell 100 and includes a lower case 310 and an upper case 320.

The lower case 310 has an open upper portion, is formed to surround a part of both sides of the battery cell 100 and the lower surface thereof, and has a pair of slits 310a. The slit 310a is formed at a location in one side of the lower case 310, which corresponds to the lead coupling portion 211 of the bus bar 200, and gives a space in which the lead coupling portion 211 is received when the battery cell 100 is inserted into the lower case 310. Therefore, the battery cell 100 and the bus bar 200 may be respectively located at an inner side and an outer side of the lower case 310 while maintaining an electric connection between them.

Meanwhile, an external terminal 311 is provided at a location on one side of the lower case 310, which corresponds to the terminal groove 220a of the bus bar 200, and formed to protrude out of the lower case 310.

The external terminal 311 is sized and shaped corresponding to the terminal groove 220 of the bus bar 200 and gives a space through which the external terminal 311 may be inserted into the bus bar 200 when the battery cell 100 is received in the lower case 310. The external terminal 311 plays a role of electrically connecting an external device (not shown) to the battery cell 100. The external terminal 311 and the bus bar 200 may also be coupled by welding in aspect of minimization of contact resistance and improvement of coupling force between the external terminal 311 and the bus bar 200.

The upper case 320 has an open lower portion and is formed to surround a part of both sides of the battery cell 100 inserted into the lower case 310, namely a part of the sides through which the electrode leads 111, 112 are drawn, and an upper surface thereof. The upper case 320 may be coupled to the lower case 310 using a bolt.

Meanwhile, the upper case 320 has sensor coupling units 320a at both sides thereof so that the voltage sensor 321 may be inserted therein. The voltage sensor 321 is electrically connected to the battery cell 100 in the sensor coupling unit 320a and senses a voltage of the battery cell 100.

As described above, the bus bar 200 having a double structure in which the metal plates 210, 220 are connected by the metal bridge 230 is applied to the battery module 1 according to the present disclosure. Therefore, when an overcurrent occurs, the battery module 1 may ensure safety in use since the bus bar 200 is rapidly broken. In particular, by applying a current interrupting unit to the bus bar 200 which is installed at an outer side of the case, the battery module 1 may further reduce the possibility of firing or explosion in comparison to cases in which the current interrupting unit is applied to a part adjacent to an electrode assembly (not shown), for example the leads 111, 112.

Next, various embodiments of a coupling pattern between the metal plates 210, 220 and the metal bridge 230 will be described with reference to FIGS. 5 to 11.

First, a structure of a bus bar 200a according to an embodiment of the present disclosure will be described with reference to FIGS. 5 to 9c.

FIGS. 5 to 10 show various modifications of the bus bar 200a according to an embodiment of the present disclosure, and the bus bar 200a is formed by coupling the metal bridge 230 to the metal plates 210, 220 by welding. In other words, the metal bridge 230 plays a role of a soldering bridge which connects the metal plates 210, 220 to each other.

Figure 5:
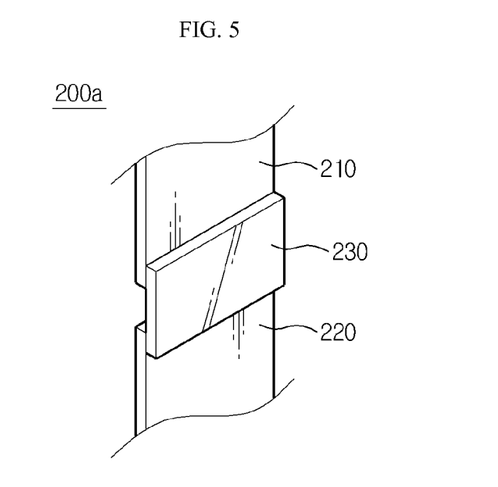

Referring to FIG. 5, the first metal plate 210 and the second metal plate 220 are located on the same plane with a regular gap, and the metal bridge 230 is formed on the upper surfaces of the metal plates 210, 220 and joined to the metal plates 210, 220. Even though FIG. 5 shows that the metal bridge 230 is formed only in the upper surfaces of the metal plates 210, 220, the metal bridge 230 may also be formed in both upper and lower surfaces of the metal plates 210, 220, which may reinforce a coupling force between the metal plates 210, 220.

Figure 7A:
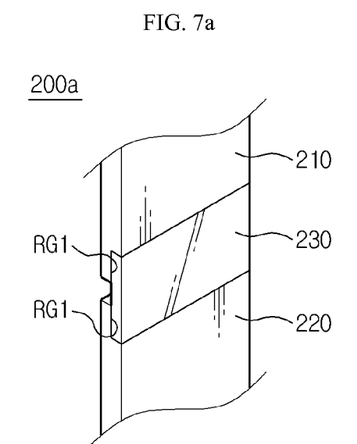

Referring to FIG. 7a, the first metal plate 210 and the second metal plate 220 are located on the same plane with a regular gap and have accommodation grooves RG1 formed in the upper surface thereof at one side end thereof which face each other. Meanwhile, the metal bridge 230 is sized and shaped corresponding to the accommodation grooves RG2 (→RG1), and the metal bridge 230 is accommodated in a space formed by engagement of the accommodation grooves RG1 and joined to the metal plates 210, 220. Even though FIG. 7a shows that the accommodation grooves RG1 are formed only in the upper surfaces of the metal plates 210, 220, the accommodation grooves RG1 may also be formed in the lower surface or both upper and lower surfaces of the metal plates 210, 220.

Figure 7B:
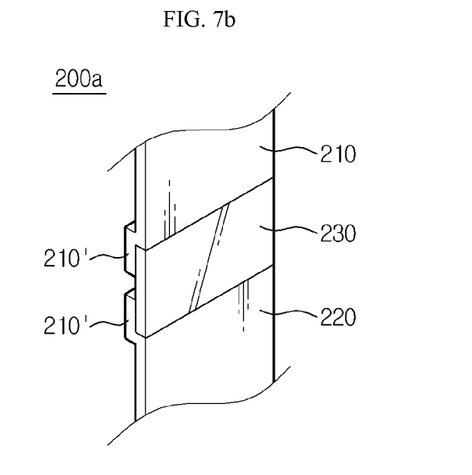

Referring to FIG. 7b, the first metal plate 210 and the second metal plate 220 are located on the same plane with a regular gap and have a first bent portion 210' and a second bent portion 220' formed at one side thereof which face each other. Meanwhile, the metal bridge 230 is accommodated in a space formed by engagement of the first bent portion 210' and the second bent portion 220' and joined to the metal plates 210, 220.

Figure 7C:
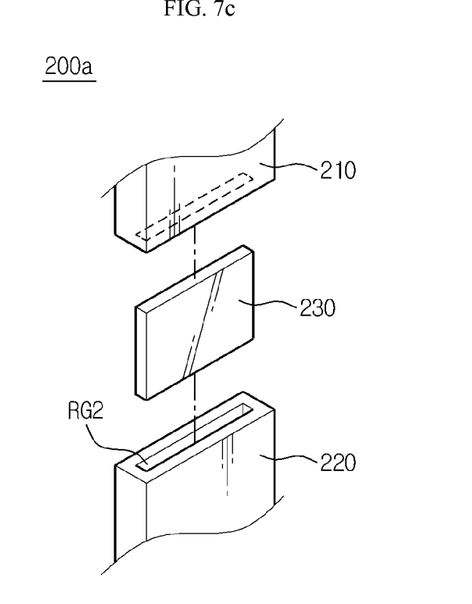

Referring to FIG. 7c, the first metal plate 210 and the second metal plate 220 are located on the same plane with a regular gap and have accommodation grooves RG2 formed with a predetermined depth from surfaces thereof which face each other. Meanwhile, both sides of the metal bridge 230 are inserted into the accommodation grooves RG2 and joined to the metal plates 210, 220.

Figure 6:
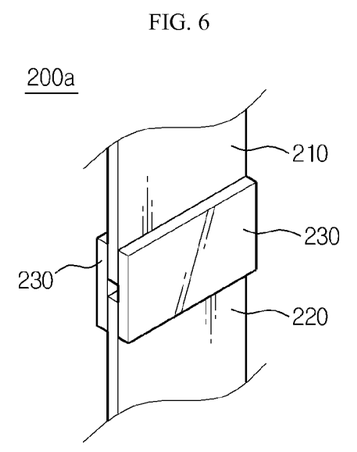

The structures shown in FIGS. 7a, 7b and 7c reinforce a coupling force between the metal plates 210, 220 and decrease a contact resistance since a contact area between the metal plates 210, 220 and the metal bridge 230 increases, in comparison to the structures shown in FIGS. 5 and 6.

Figure 8A:
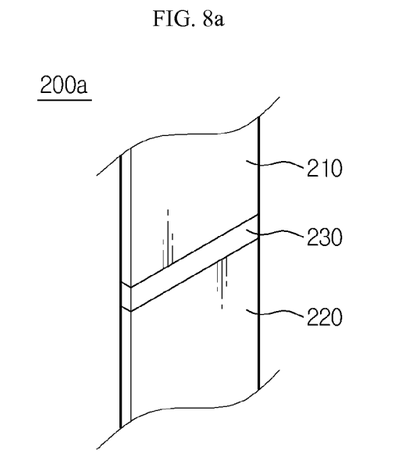

Referring to FIG. 8a, the first metal plate 210 and the second metal plate 220 are located on the same plane with a regular gap, and the metal bridge 230 is directly interposed between surfaces of the metal plates 210, 220 which face each other and joined to the metal plates 210, 220.

Figure 8B:
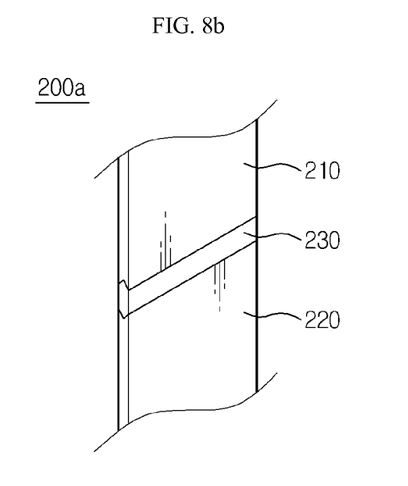

The structure of FIG. 8b is different from the structure of FIG. 8a in the point that surfaces of the metal plates 210, 220 which face each other have an inclined shape tapered toward the metal bridge. In this case, the contact area between the metal plates 210, 220 and the metal bridge 230 increases further, which reinforces a coupling force between the metal plates 210, 220 and decreases a contact resistance.

Figure 9A:
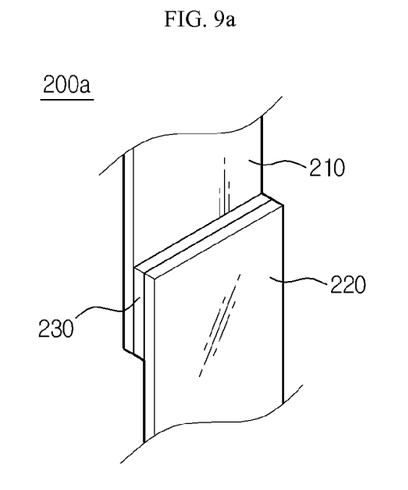

Referring to FIG. 9a, the first metal plate 210 and the second metal plate 220 are located so that one side of the first metal plate 210 and one side of the second metal plate 220 face each other while overlapping each other at least partially, and the metal bridge 230 is interposed in the entire facing region and joined to the metal plates 210, 220.

Figure 9B:
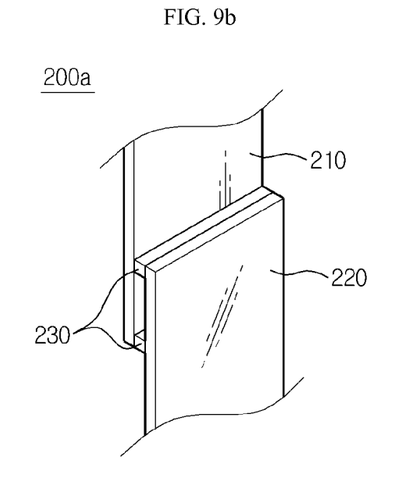
Figure 9C:
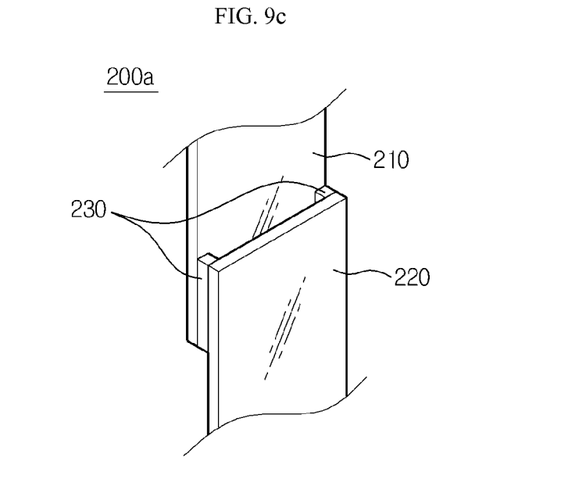

The structures of FIGS. 9b and 9c are different from the structures of FIG. 9a in view of the area of the metal bridge 230 interposed between the metal plates 210, 220. In other words, the metal bridge 230 is formed only at one side and the other side among a circumference of the region where the metal plates 210, 220 faces each other. In this case, when an overcurrent occurs at the battery module 1, it may be expected that the bus bar 200 is broken rapidly. Meanwhile, though not shown in the figures, the metal bridge 230 may also be formed at the entire circumference of the facing region. In this case, it is expected that the metal bridge 230 will be broken more rapidly in comparison to the structure of FIG. 9a, and the coupling force between the metal plates 210, 220 will be more excellent in comparison to the structures of FIGS. 9b and 9c.

Next, a bus bar 200b according to another embodiment of the present disclosure will be described with reference to FIG. 10.

Figure 10:
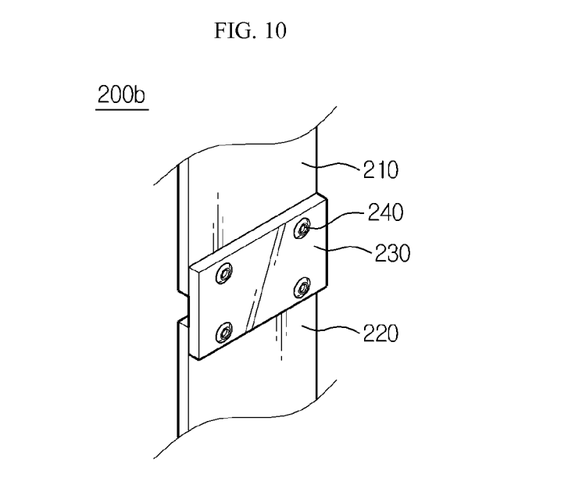
FIG. 10 is a partial perspective view showing a bus bar according to another embodiment of the present disclosure.

The bus bar 200b of FIG. 10 is different from the bus bar 200a of FIG. 5 in the point that a rivet 240 is further formed between the metal plates 210, 220 and the metal bridge 230. The rivet 240 plays a role of enhancing a coupling force between the metal plates 210, 220 and the metal bridge 230.

Meanwhile, even though FIG. 10 shows that the rivet 240 is additionally applied to the bus bar 200a of FIG. 5, the present disclosure is not limited thereto, and the rivet 240 may also be applied to the structures of FIGS. 6 to 7c.

Next, a bus bar 200c according to another embodiment of the present disclosure will be described with reference to FIG. 11.

Figure 11:
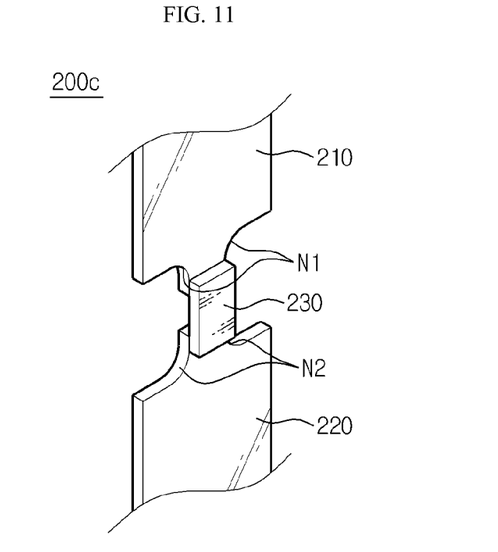
FIG. 11 is a partial perspective view showing a bus bar according to another embodiment of the present disclosure.

The bus bar 200c of FIG. 11 is different from the bus bar 200a of FIG. 5 in the point that one side of the first metal plate 210 and one side of the second metal plate 220 which face each other have tapered portions N1, N2 which are narrowed toward an end thereof. In this case, since electric resistances at the tapered portions N1, N2 increase in comparison to the bus bar 200a of FIG. 5, more heat is generated when an overcurrent occurs, and therefore the bus bar 200c may be broken rapidly.

Meanwhile, even though FIG. 11 shows that the tapered portions N1, N2 are additionally formed at the bus bar 200a of FIG. 5, the present disclosure is not limited thereto, and the tapered portions N1, N2 may also be applied to the structures of FIGS. 6 to 9c. In particular, in the case a structure for increasing a contact area between the metal plates 210, 220 and the metal bridge 230 is coupled to the bus bar 200a of FIG. 11 as shown in FIGS. 7a to 7c, the bus bar 200c may be rapidly broken when an overcurrent occurs, the coupling force between the metal plates 210, 220 is excellent, and a contact resistance is low.

Next, a short-circuit experiment procedure and experiment results for the battery module 1 to which the bus bar 200a is applied will be described with reference to FIG. 12.

The short-circuit experiment has been performed to the battery module 1 to which the bus bar 200a as shown in FIG. 8a is applied under the following conditions:

Output voltage of the battery module: 64.5V (fifteen unit cells having an output voltage of 4.3V were connected in series)

Resistance value between the external terminals: 5 mΩ

State of charge (SOC) of the battery module: 100%

Figure 12:
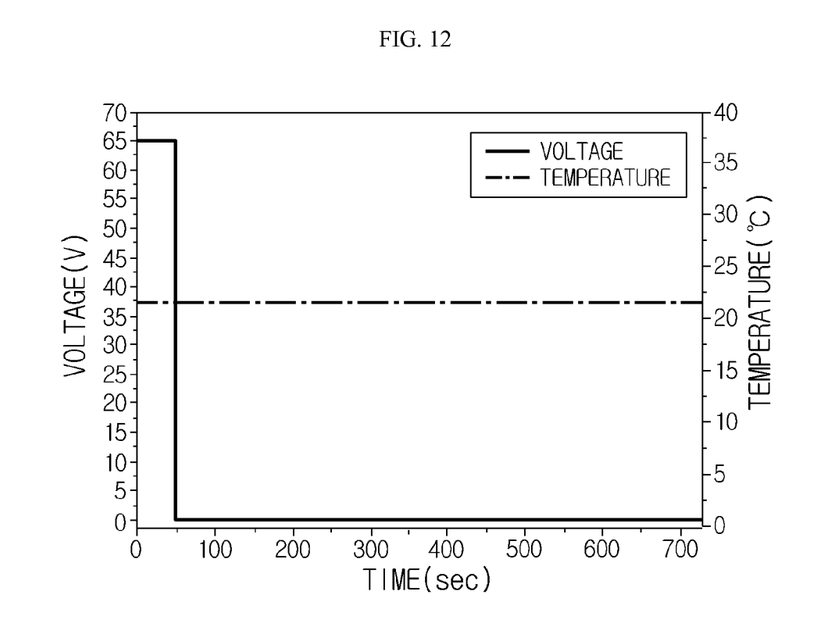
FIG. 12 is a graph showing short-circuit experiment results for the battery module according to the present disclosure.

In the experiment performed under the above conditions, as shown in FIG. 12, the voltage of the battery module 1 measured between the external terminals 311 was kept at about 65V for about 50 seconds and then dropped to 0V. In other words, after about 50 seconds passed, the bus bar was broken by the short-circuit current. At this time, the temperature measured at the unit cells was constantly maintained at about 23° C. through the short-circuit experiment.

By doing so, it may be understood that the bus bar 200a applied to the battery module 1 according to the present disclosure may ensure safety in use of a secondary battery by rapidly interrupting a short-circuit current before the temperature of unit cells increases in substance.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module, comprising:
   a plurality of unit cells;
   a case, the plurality of unit cells enclosed in the case;
   an external terminal installed at one side of the case;
   an electrode lead connected to the plurality of unit cells; and
   a bus bar configured to connect the plurality of unit cells positioned in the case and the external terminal positioned out of the case,
   wherein the bus bar includes:
      a first metal plate connected to the electrode lead;
      a second metal plate spaced apart from the first metal plate and connected to the external terminal; and
      a metal bridge configured to connect the first metal plate and the second metal plate, the metal bridge having a lower melting point than the first metal plate and second metal plate.

2. The battery module according to claim 1, wherein the metal bridge is a lead-free alloy containing tin (Sn) and copper (Cu) as main components.

3. The battery module according to claim 2, wherein the content of the tin is 80 to 98 wt %, and
   wherein the content of the copper is 2 to 20 wt %.

4. The battery module according to claim 3, wherein the metal bridge further includes at least one additional metal selected from the group consisting of nickel (Ni), zinc (Zn) and silver (Ag).

5. The battery module according to claim 4, wherein the content of the additional metal is 0.01 to 10 wt %.

6. The battery module according to claim 1, wherein the metal bridge has a melting point of 150 to 300° C.

7. The battery module according to claim 1, wherein the first metal plate and the second metal plate are located on the same plane with a regular gap.

8. The battery module according to claim 7, wherein the metal bridge is joined to the first metal plate and the second metal plate on any one surface or both surfaces of the first metal plate and the second metal plate.

9. The battery module according to claim 7, wherein the first metal plate and the second metal plate have accommodation grooves formed in at least one of the upper and lower surfaces at one side end thereof, which face each other, and
   wherein the metal bridge is sized and shaped corresponding to the accommodation groove, and is accommodated in a space formed by engagement of the accommodation grooves and joined to the first metal plate and the second metal plate.

10. The battery module according to claim 7, wherein the first metal plate and the second metal plate have a first bent portion and a second bent portion respectively formed at one side end of the first metal plate and one side end of the second metal plate which face each other, and
    wherein the metal bridge is accommodated in a space formed by engagement of the first bent portion and the second bent portion and is joined to the first metal plate and the second metal plate.

11. The battery module according to claim 7, wherein the first metal plate and the second metal plate have accommodation grooves formed with a predetermined depth from surfaces thereof which face each other, and
    wherein both sides of the metal bridge are respectively inserted into the accommodation grooves and joined to the metal plate.

12. The battery module according to claim 7, wherein the metal bridge is directly interposed between surfaces of the first metal plate and the second metal plate which face each other and is joined to the first metal plate and the second metal plate.

13. The battery module according to claim 12, wherein the facing surfaces have an inclined surface tapered toward the metal soldering bridge.

14. The battery module according to claim 1, wherein the first metal plate and the second metal plate are located so that one side of the first metal plate and one side of the second metal plate face each other while overlapping each other at least partially, and
    wherein the metal bridge is interposed in the facing region and joined to the first metal plate and the second metal plate.

15. The battery module according to claim 1, wherein the first metal plate and the second metal plate are located so that one side of the first metal plate and one side of the second metal plate face each other while overlapping each other at least partially, and
    wherein the metal bridge is formed at one side and the other side of a circumference of the facing region.

16. The battery module according to claim 1, wherein the first metal plate and the second metal plate are located so that one side of the first metal plate and one side of the second metal plate face each other while overlapping each other at least partially, and
    wherein the metal bridge is formed at the entire circumference of the facing region.

17. The battery module according to claim 1, further comprising a rivet for fixing the first metal plate and the metal bridge and fixing the second metal plate and the metal bridge.

18. The battery module according to claim 1, wherein one side of the first metal plate and one side of the second metal plate which face each other have a tapered shape which is narrowed toward an end thereof.

19. A battery module, comprising:
    a plurality of unit cells including a cathode lead and an anode lead;
    a case for accommodating the plurality of unit cells;
    a first external terminal and a second external terminal installed at one side of the case;
    a first bus bar configured to connect the cathode lead of the plurality of unit cells positioned in the case and the first external terminal positioned out of the case; and
    a second bus bar configured to connect the anode lead of the plurality of unit cells positioned in the case and the second external terminal positioned out of the case,
    wherein the second bus bar includes:
       a first metal plate connected to the anode lead;
       a second metal plate spaced apart from the first metal plate and connected to the second external terminal; and
       a metal bridge configured to connect the first metal plate and the second metal plate, the metal bridge having a lower melting point than the first metal plate and the second metal plate.

* * * * *